(No Model.)

H. J. HOVEY & G. R. HARDISON.
MACHINE FOR MANUFACTURING SPOOL BLANKS.

No. 372,372. Patented Nov. 1, 1887.

Witnesses.
R. B. Torrey
Wm H. Preston

Inventors.
Henry J. Hovey,
George R. Hardison,
by Singleton & Piper atty's

UNITED STATES PATENT OFFICE.

HENRY JELLISON HOVEY AND GEORGE ROWLAND HARDISON, OF GOULDS-BOROUGH, MAINE.

MACHINE FOR MANUFACTURING SPOOL-BLANKS.

SPECIFICATION forming part of Letters Patent No. 372,372, dated November 1, 1887.

Application filed July 1, 1887. Serial No. 243,122. (No model.)

*To all whom it may concern:*

Be it known that we, HENRY JELLISON HOVEY and GEORGE ROWLAND HARDISON, of Gouldsborough, in the county of Hancock, of the State of Maine, have invented a new and useful Improvement in Machines for Manufacturing Spool-Blanks; and we do hereby declare the same to be described in the following specification and represented in the accompanying drawings, of which—

Figure 1:
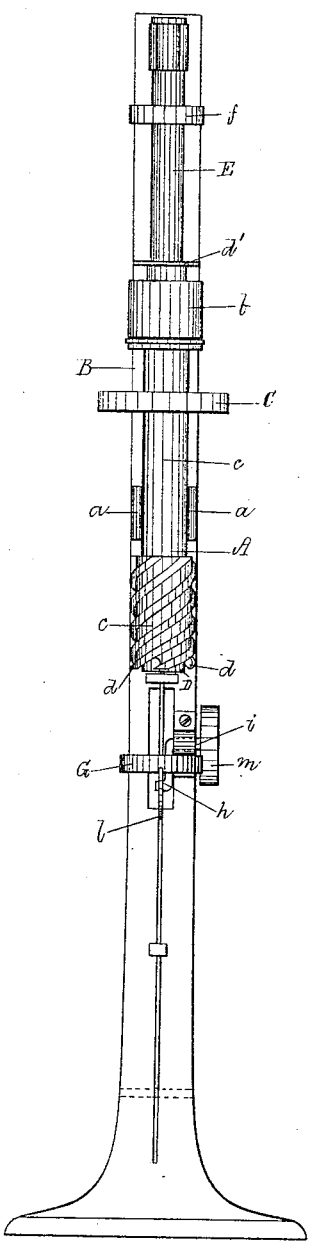
Figure 2:
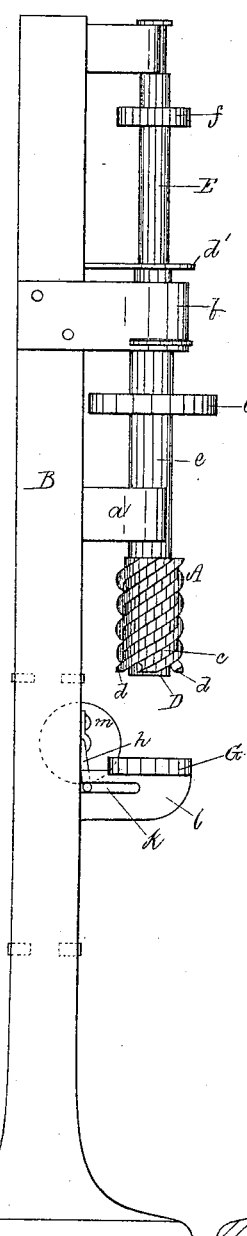
Figure 3:
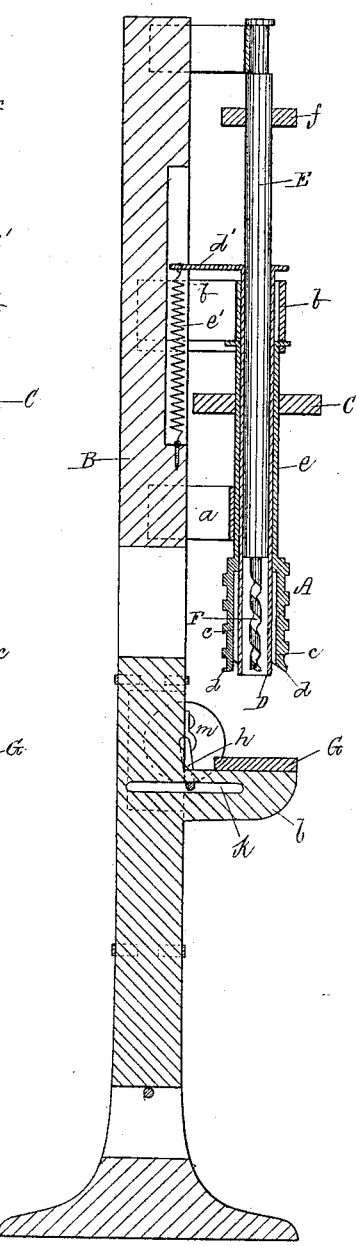

Figure 1 is a front elevation, Fig. 2 a side view, and Fig. 3 a vertical and median section, of a machine embodying my invention, the nature of which is defined in the claim hereinafter presented.

Each blank made by the machine is a cylinder of wood provided with a bore extending through it axially from end to end, the grain of the wood running lengthwise of the blank. These blanks are to be bored from a short block or section of a log of hard wood, each blank after being made being by other and suitable mechanism converted into a spool.

In such drawings, A is a tubular borer supported in suitable bearings, $a$ $b$, projecting from a post, B, such borer being formed to bore endwise into a block of wood an annular hole about a cylindrical core, the lower part of the borer being spirally threaded, as shown at $c$, for removal from the block of the shavings produced by the cutters or teeth $d$ of such borer. There is fixed on the tubular shank $e$ of the borer a pulley, C, for revolving it by means of an endless belt suitably applied to such pulley. Within the borer is the discharger D, which is a tube that extends above the borer, and is provided with an arm, $d'$, that projects rearwardly from the upper end of it, (the said tube,) a spring, $e'$, fixed to the arm and the post B, serving to depress the discharger, which, when at its lowest position, projects a little below the tubular borer A. Furthermore, there is within the discharger, concentrically and projecting above it, a spindle, E, provided at its lower end with a bit, F, for boring the hole axially through the spool-blank core or cylinder produced by the borer A. The spindle E is supported so as to be revolved by an endless band applied to a pulley, $f$, fixed on such spindle, the said spindle having no vertical movements.

Below the borer A is a table, G, suitably applied to the post or standard B, so as to be capable of being reciprocated vertically, such movements of the table being effected by means of a crank, $h$, projecting from a short shaft, $i$, and extending into a slot, $k$, in the bracket $l$, that supports the table. The shaft $i$ has fixed on it a pulley, $m$, to be revolved by an endless belt and to cause the shaft and crank to revolve, and in so doing to impart to the table its vertical reciprocating motion.

In using the machine a block to be converted into spool-blanks is placed on the table, which in rising forces the block upward against the borer and the discharger. The borer, being in rapid revolution, bores down through the block while it is rising, the discharger rising with the block, and during its descent serving to force the cylindrical block down within and out of the borer and off the bit, which in the meantime, by being in revolution, has bored the hole through the blank axially thereof. After a blank may thus have been produced from the block, the latter should be moved so as to carry a fresh portion of it underneath the borer A, which, as the table may be next forced upward, will cut or bore into the block, as before. In this way the block may have reduced from it a series of the blanks.

In practice we have found the above-described machine an excellent one for its purpose, as with it we can manufacture the spool-blanks very expeditiously and save the necessity of shipping to market waste stock, as by making the spool-blanks at or near where the wood may have grown the necessity of transporting the wood to the place for converting the blanks into spools can be avoided, and thereby save the transportation of the waste wood.

We claim—

The machine, substantially as described, for manufacturing spool-blanks, it consisting of the tubular borer A, spirally threaded, as described, the tubular discharger D, arranged within such borer and provided with a spring, $e'$, for depressing it, the said discharger, as explained, the spindle E and its bit F, arranged within the discharger, and the vertically-reciprocating table G, having mechanism for operating it, all being arranged with and applied to a post or standard, essentially in manner and to operate as and for the purpose specified.

HENRY JELLISON HOVEY.
GEORGE ROWLAND HARDISON.

Witnesses:
WILLIAM O. EMERY,
HANNAH L. EMERY.